(12) United States Patent
Plennevaux et al.

(10) Patent No.: US 11,248,185 B2
(45) Date of Patent: Feb. 15, 2022

(54) METHOD FOR PROCESSING BIOMASS BY CO-GRINDING WITH A FOSSIL-BASED FEEDSTOCK

(71) Applicants: IFP Energies Nouvelles, Rueil-Malmaison (FR); Axens, Rueil Malmaison (FR); Commissariat A L'Energie Atomique Et Aux Energies Alternatives, Paris (FR); Total Raffinage Chimie, Courbevoie (FR); Thyssenkrupp Industrial Solutions AG, Essen (DE); Avril, Paris (FR); Bionext, Venette (FR)

(72) Inventors: Thomas Plennevaux, Lyons (FR); Jeremy Gazarian, Condrieu (FR); Laurent Bournay, Chaussan (FR); Norbert Ullrich, Essen (DE)

(73) Assignees: IFP Energies Nouvelles, Rueil Malmaison (FR); Axens, Rueil Malmaison (FR); Commissariat A L'Energie Atomique Et Aux Energies Alternatives, Paris (FR); Total Raffinage Chimie, Courbevoie (FR); Thyssenkrupp Industrial Solutions AG, Essen (DE); Avril, Paris (FR); Bionext, Venette (FR)

( * ) Notice: Subject to any disclaimer, the term of this patent is extended or adjusted under 35 U.S.C. 154(b) by 0 days.

(21) Appl. No.: 16/628,891

(22) PCT Filed: Jul. 3, 2018

(86) PCT No.: PCT/EP2018/067911
§ 371 (c)(1),
(2) Date: Jan. 6, 2020

(87) PCT Pub. No.: WO2019/007938
PCT Pub. Date: Jan. 10, 2019

(65) Prior Publication Data
US 2020/0231889 A1    Jul. 23, 2020

(30) Foreign Application Priority Data
Jul. 7, 2017 (FR) ...................................... 1756406

(51) Int. Cl.
*C10L 5/44* (2006.01)
*C10L 5/04* (2006.01)
(Continued)

(52) U.S. Cl.
CPC ................................. *C10L 5/44* (2013.01);
*C10L 5/04* (2013.01); *C10L 5/366* (2013.01); *C10L 9/083* (2013.01);
(Continued)

(58) Field of Classification Search
CPC ......... C10L 2200/0469; C10L 2290/02; C10L 2290/06; C10L 2290/08; C10L 2290/28;
(Continued)

(56) References Cited

U.S. PATENT DOCUMENTS 9,913,916 B2 * 3/2018 DeSimone ............. A61K 47/62
2011/0179701 A1 7/2011 Grassi
(Continued)

FOREIGN PATENT DOCUMENTS

| DE | 19618880 A1 | 11/1997 |
| FR | 2924435 A1 | 6/2009 |
| WO | 2014/068253 A1 | 5/2014 |

OTHER PUBLICATIONS

International Search Report dated Jul. 31, 2018 issued in corresponding PCT/EP2018/067911 application (3 pages).
English Abstract of DE 19618880 A1 published Nov. 13, 1997.

*Primary Examiner* — Latosha Hines
(74) *Attorney, Agent, or Firm* — Millen White Zelano and Branigan, PC; Csaba Henter

(57) ABSTRACT

Process for the treatment of a feedstock containing biomass, the process including
a) drying the feedstock at a temperature between 20 and 180° C. for a duration between 5 and 180 minutes,
(Continued)

b) torrefaction of the feedstock originating from step a) in order to produce at least one torrefied biomass solid effluent, c) co-grinding the torrefied biomass solid effluent originating from step b), in the presence of at least one solid fossil feedstock in order to obtain a powder.

25 Claims, 1 Drawing Sheet

(51) Int. Cl.
*C10L 5/36* (2006.01)
*C10L 9/08* (2006.01)

(52) U.S. Cl.
CPC ... *C10L 2200/0469* (2013.01); *C10L 2290/02* (2013.01); *C10L 2290/06* (2013.01); *C10L 2290/08* (2013.01); *C10L 2290/28* (2013.01)

(58) Field of Classification Search
CPC .... C10L 5/04; C10L 5/366; C10L 5/44; C10L 9/083; Y02E 50/10; Y02E 50/30
See application file for complete search history.

(56) References Cited

U.S. PATENT DOCUMENTS

| | | | |
|---|---|---|---|
| 2011/0209977 A1* | 9/2011 | Rolland | C10L 9/083 |
| | | | 201/31 |
| 2011/0314728 A1 | 12/2011 | Camper et al. | |
| 2013/0055631 A1* | 3/2013 | Camper | C10L 5/32 |
| | | | 44/589 |
| 2013/0104450 A1 | 5/2013 | Dodson et al. | |
| 2014/0173929 A1 | 6/2014 | Olofsson et al. | |
| 2014/0208995 A1* | 7/2014 | Olofsson | C10L 5/366 |
| | | | 110/222 |
| 2014/0305033 A1 | 10/2014 | Chataing | |
| 2015/0275112 A1* | 10/2015 | Boissonnet | C10G 2/32 |
| | | | 518/703 |

\* cited by examiner

METHOD FOR PROCESSING BIOMASS BY CO-GRINDING WITH A FOSSIL-BASED FEEDSTOCK

TECHNICAL FIELD

The present invention relates to the treatment of biomass for its preparation for the purpose of its upgrading, in particular by gasification, for the production of liquid hydrocarbons, and optionally the production of petrochemical bases and/or chemical bases and/or hydrogen.

More particularly, the present invention relates to a process for the treatment of a feedstock comprising biomass with a view to its injection into a gasification reactor for the production of hydrocarbons, in particular gasoline, gas oil and kerosene.

PRIOR ART

In the field of the invention, a person skilled in the art constantly seeks to improve the conditioning of biomass, in particular in order to improve its calorific value.

More particularly, the improvement of the granulometry of the powder obtained by the treatment process based on biomass and the energy cost associated with this treatment are essential parameters in the preparation of the biomass, in particular in the most widespread gasification processes.

The treatment of biomass is well known to a person skilled in the art for its upgrading through the production of hydrocarbons. The main steps of this treatment are drying, heat treatment such as torrefaction, and grinding. These steps are in particular described in application WO2014/068253. The main parameters of this treatment are the characteristics of the powder obtained, in particular its dimensions, as well as the energy cost of the grinding and more generally of the process.

Application WO2013/114328 describes a process for grinding a carbon-containing feedstock originating from biomass in the presence of additives in the form of a micron-sized powder originating from mineral material such as magnesium stearate or silica in the form of microbeads and/or plant materials such as wood carbon or fossil carbon, with the aim of improving the properties of the powder obtained by the grinding of the biomass such as the flowability and the suitability for fluidization, thus allowing an intimate mixture of powders of small granulometries to be obtained. This document does not describe the use of additives other than in the form of powder and only with micron-sized dimensions, during grinding of the biomass.

Optimization of the treatment and of the conditioning of the biomass, in particular by simplifying the processes implemented, reducing the energy cost of said steps, in particular the grinding step, remains a significant challenge in the field of the invention.

Surprisingly, the applicant has discovered a process for the treatment of a biomass feedstock by at least one step of co-grinding of said feedstock in a mixture with at least one solid fossil feedstock. Advantageously, said co-grinding allows the grinding of the feedstocks as well as the drying and grinding of the fossil feedstock. In fact the grinding of the biomass feedstock is an exothermic step and the heat generated advantageously allows simultaneous drying of the fossil feedstock. A further advantage of the process according to the invention is the reduction in the energy cost of the process by energy integration of the gases formed during the different steps.

SUMMARY OF THE INVENTION

A subject of the present invention is to provide a novel process for the treatment of a feedstock comprising biomass, said process comprising at least the following steps:
a) A step of drying said feedstock at a temperature comprised between 20 and 180° C. for a duration comprised between 5 and 180 minutes,
b) A step of torrefaction of the feedstock originating from step a) in order to produce at least one torrefied biomass solid effluent, and
c) A step of co-grinding the torrefied biomass solid effluent originating from step b), in the presence of at least one solid fossil feedstock in order to obtain a powder.
in which
the quantity of residual water at the end of drying step a) is comprised between 0% and 5% by weight with respect to the total weight of the feedstock,
the dimensions of the solid fossil feedstock introduced in co-grinding step c) are comprised between 1 and 100 millimetres and preferentially between 2 and 80 millimetres,
the solid fossil feedstock, input into co-grinding step c) has a moisture content comprised between 3.1 and 30% by weight, preferentially between 4 and 25% by weight.

An advantage of the process according to the present invention is to allow an intimate mixture of powders of small granulometries to be obtained, originating from biomass and fossil feedstock.

An advantage of the co-grinding according to the present invention is to allow the drying of the fossil feedstock simultaneously with said step of co-grinding by the transfer of the thermal energy released by the grinding of the biomass to the fossil feedstock.

A further advantage of the present invention is to allow the treatment of the biomass at a limited energy cost, by means of combining a series of steps operating under specific conditions, allowing their energy integration.

Preferably, the process comprises a step d) of final drying of the powder obtained at the end of step c) at a temperature comprised between 100 and 300° C.

Preferably, the drying step d) is carried out simultaneously with the co-grinding step c).

Preferably, the biomass is selected from any type of biomass, preferably from biomass of the solid type, and in particular from biomass of the lignocellulosic type. Non-limitative examples of types of biomass relate for example to the residues from agricultural operations (in particular straw, maize cobs), residues from forestry operations, products from forestry operations, residues from sawmills and dedicated crops, for example short rotation coppice.

Preferably, the process comprises a step i) of pretreatment of the biomass, preferably of primary grinding.

Preferably, torrefaction step b) is carried out at a temperature comprised between 200 and 350° C., preferably between 220 and 340° C., preferably between 250 and 320° C. and more preferentially between 270 and 300° C. for a duration comprised between 5 and 180 minutes, and preferentially between 15 and 60 minutes, at an absolute operating pressure preferentially comprised between 0.1 and 15 bar, preferably between 0.1 and 10 bar and more preferably between 0.5 and 1.5 bar.

Preferably, the process comprises a step ii) of combustion of the torrefaction gases (11) originating from step b).

Preferably, the energy originating from step ii) of combustion of the torrefaction gases (11) is used in order to provide the necessary thermal energy in a step of the process, preferably in steps a), b) and/or d).

Preferably, the solid fossil feedstock (9) introduced in co-grinding step c) is selected from the solid fossil hydrocarbons such as coal, petcoke, oil tanker residues, bituminous sands or derivatives thereof and oil shales or derivatives thereof.

Preferably, the solid fossil feedstock (9) undergoes a preliminary drying step iii).

Preferably, the torrefied biomass solid effluent originating from step b) is introduced in co-grinding step c) in a percentage by weight between the torrefied biomass solid effluent in the total solid feedstock comprised between 1 and 99% by weight, preferably between 50 and 98% by weight, and preferentially between 40 and 95% by weight, said total solid feedstock being the sum of the torrefied biomass solid effluent and the fossil feedstock.

Preferably, the solid fossil feedstock, input into co-grinding step c) has a moisture content comprised between 5 and 20% by weight.

Preferably, the process comprises one or more steps e) of storage of the effluent originating from one or any of the steps of the process, preferably from step a), b), c), or d).

Preferably, the process comprises a step f) of transport, preferably of pneumatic transport.

Preferably, the process comprises a step g) of gasification at a temperature comprised between 800 and 1800° C., preferably between 1000 and 1600° C. and more preferentially between 1200 and 1500° C. and at an absolute pressure advantageously comprised between 20 and 120 bar, preferably between 25 and 60 bar, and more preferentially between 30 and 50 bar.

Definitions & Abbreviations

Throughout the description as a whole, the terms or abbreviations hereinafter have the following meaning.

By biomass is meant, non-limitatively, the material from biomass of the solid type, and in particular from biomass of the lignocellulosic type. Non-limitative examples of types of biomass relate for example to the residues from agricultural operations (in particular straw, maize cobs), residues from forestry operations, products from forestry operations, residues from sawmills and dedicated crops, for example short rotation coppice.

By solid fossil material is meant, non-limitatively, the material, alone or in a mixture, solid under the conditions of the grinding step, and selected from solid fossil hydrocarbons such as coal, petcoke, oil tanker residues, bituminous sands or derivatives thereof and oil shales or derivatives thereof.

By anhydrous weight loss is meant the percentage of material lost during the torrefaction step (excluding water) compared to the total weight injected in the torrefaction step (excluding water).

By torrefaction is meant a heat treatment process at a temperature comprised between 200 and 350° C., and generally carried out in an oxygen-depleted atmosphere.

By gasification is meant a step implementing a partial oxidization reaction which converts the feedstock to synthesis gas comprising a majority of carbon monoxide and hydrogen.

By co-grinding is meant the grinding of the biomass feedstock in the presence of the solid fossil feedstock.

By relationship or weight ratio is meant the ratio between the weight of the constituent in question with respect to the total weight of the feedstock.

By characteristic size is meant the measurement of the length of a particle along its largest dimension.

By anisotropic is meant variable strength properties of the material according to the orientation of the force to which it is subjected.

By moisture content is meant the ratio between the weight of water contained in a feedstock and the total weight of said feedstock.

DETAILED DESCRIPTION OF THE INVENTION

Within the meaning of the present invention, the various embodiments presented can be used alone or in combination with one another, with no limitation on the combination.

The Feedstock

According to the invention, the feedstock of the process comprises biomass, alone or in a mixture. The quantity of water contained in the crude feedstock is comprised between 0.0 and 70.0% by weight, preferably between 5.0 and 70.0%, preferably between 10.0 and 70.0%.

The biomass is selected from any type of biomass, preferably from biomass of the solid type, and in particular from biomass of the lignocellulosic type. Non-limitative examples of types of biomass relate for example to the residues from agricultural operations (in particular straw, maize cobs), residues from forestry operations, products from forestry operations, residues from sawmills and dedicated crops, for example short rotation coppice.

Preferably, the biomass is lignocellosic biomass. It comprises essentially three natural constituents present in variable quantities according to its origin: cellulose, hemicellulose and lignin.

The lignocellosic biomass feedstock is preferably used in its raw form, i.e. in the entirety of its three constituents, cellulose, hemicellulose and lignin.

In a preferred embodiment of the invention, the lignocellosic biomass is selected from grass biomass, residues from agricultural operations such as waste straw, maize cobs, crushed sugar cane stalks, residues from forestry operations or from sawmills such a wood chips or other type of ligneous residues.

In a preferred embodiment of the invention, said feedstock (1) can optionally undergo a step i) of pretreatment prior to its introduction into step a) of the process according to the invention. The objective of pretreatment step i) is to allow the injection of the pretreated feedstock (2) into drying step a).

Pretreatment step i) is a function of the type of feedstock in question. Preferably, pretreatment step i) is a primary grinding step of said feedstock making it possible to reduce its granulometry to a characteristic size comprised between 10 and 50 mm. Said primary grinding step i) is advantageously carried out according to a technique known to a person skilled in the art.

Pretreatment step i) can also advantageously comprise forming the feedstock such as for example by pelletization, compression or any other technique known to a person skilled in the art with a view to facilitating its transport, storage and subsequent treatment in drying step a) of the process according to the invention.

Drying Step a)

According to the invention, the process comprises a step a) of drying the feedstock (1), optionally pretreated (2), said drying step a) is implemented by bringing the feedstock into contact with a hot gas flow which cools down. The hot gas flow enters said step at a temperature comprised between 50 and 500° C., preferably between 100 and 450° C., and preferentially between 150 and 350° C., for a duration comprised between 5 and 180 minutes, preferably between 10 and 100 minutes and preferentially between 15 and 60 minutes and the dried and optionally pretreated feedstock (3) is supplied. The dried solid leaves said step at a temperature comprised between 40 and 120° C., preferably between 50 and 90° C., even more preferentially between 60 and 80° C.

The purpose of the drying is to eliminate the water contained in the feedstock. According to the invention, the quantity of residual water at the end of drying step a) is comprised between 0% and 5% by weight with respect to the total weight of the feedstock.

The energy necessary for the drying is generally supplied by bringing the feedstock into contact with a flow of hot gases.

The flow of hot gases used in the drying step can advantageously originate from the combustion of an input to the process, and preferably from the combustion of natural gas and/or from the combustion of a gaseous flow originating from another step of the process.

For example, the combustion of the gases originating from torrefaction step b) produces a hot gas flow that can be used for drying the feedstock by any method known to a person skilled in the art.

The gaseous effluent originating from step a) containing water can be used to pre-heat the air allowing the combustion of the natural gas and/or the gaseous flow produced during the torrefaction.

In a particular embodiment, said feedstock (1) introduced in step a) consists of biomass as defined above.

Torrefaction Step b)

According to the invention, the dried feedstock (3) originating from step a) is sent to a torrefaction step b) in order to produce at least one torrefied biomass solid effluent (4).

Torrefaction is a process of mild thermal decomposition within a temperature range comprised between 200 and 350° C. This process is generally characterized by low temperature gradients (<50 C/min) and long residence times (between 20 min and 60 min).

According to the invention, torrefaction step b) is carried out at a temperature comprised between 200 and 350° C., preferably between 220 and 340° C., preferably between 250 and 320° C. and more preferentially between 270 and 300° C. for a duration comprised between 5 and 180 minutes, and preferentially between 15 and 60 minutes, at an absolute operating pressure preferentially comprised between 0.1 and 15 bar, preferably between 0.1 and 10 bar, and more preferably between 0.5 and 1.5 bar, (1 bar=0.1 MPa). The torrefaction operation is carried out in an environment the oxygen content of which is less than 10% by volume, is preferably comprised between 0 and 10% by volume, preferably between 0 and 8% by volume and preferentially between 0 and 3% by volume.

Around 200° C., the hemicelluloses, which are the most reactive compounds of the lignocellosic biomass, begin to undergo devolatilization and carbonization reactions. At this temperature level, the cellulose and the lignin, for their part, are not significantly converted. The products of decomposition of the lignocellosic biomass are generated in the form of condensable gases (mainly water, formic acid, acetic acid and other organic compounds) and non-condensable gases (mainly CO and $CO_2$).

Torrefaction modifies the structure of the lignocellosic biomass and thus its properties. In particular, the torrefaction operation makes the biomass more fragile and attenuates its highly anisotropic character. It is well known to a person skilled in the art that wood for example, due to its fibrous nature, will have a much greater elastic resistance to stretching in the direction of the fibres than if it is applied transversally thereto. Thus in comparison with a crude biomass powder of a given average granulometry, obtaining an equivalent powder based on the same biomass having undergone a torrefaction step, would require a much lower grinding energy (effect linked to the fragility of the material) and the final form of the solid particles obtained is closer to spherical particles (effect linked to the less anisotropic character), which facilitates the subsequent grinding.

Said torrefaction step b) can advantageously be implemented in a device of the rotary furnace, rotary calciner, screw conveyor furnace, moving bed furnace and fluidized bed furnace type.

According to the invention, torrefaction step b) produces a solid effluent called torrefied biomass (4).

Said torrefaction step b) also allows the production of a combustible gaseous effluent (8), called torrefaction gas, the quantity of which preferably represents from 5 to 40% of the weight of dried biomass originating from initial step a) according to the operating conditions and more preferably from 10 to 35%.

One of the key parameters of the torrefaction step is the weight loss (expressed in percentage by weight) defined as the percentage weight loss between the initial dry biomass and the dry torrefied biomass. The higher this loss, the lower the solid mass yield by weight, the greater the quantity of torrefaction gas generated. It is known that the lower calorific value (LCV) of this gas is also a function of the percentage anhydrous weight loss (the AWL is an increasing function of this percentage for a given feedstock).

According to the invention, the choice of a sufficiently high percentage of anhydrous weight loss during the torrefaction step makes it possible to limit the consumption of an input fuel in the process, in particular during drying. Thus, it limits the use of fuel of fossil origin by reusing the torrefaction gases generated in the torrefaction step.

In a preferred embodiment, the percentage anhydrous loss will be chosen so that the heat given off by the combustion of the torrefaction gases (internally or externally post-combustion) allows the energy necessary for at least one drying step to be supplied. Preferably, the anhydrous weight loss is comprised between 1.0 and 40.0% by weight, preferably between 5.0 and 35.0% by weight, and preferentially between 15.0 and 30.0% by weight, with respect to the total weight of the feedstock (3) introduced into torrefaction step b).

In an embodiment of the process, the torrefaction gases (11) are sent to a combustion step ii) in which they are burned in order to produce a flow of hot gases (12) into a combustion chamber in the presence of air and optionally natural gas being able to be sent to drying steps a) and/or d), or a flow of hot gas (13) being able to be sent to torrefaction step b). Combustion step ii) can advantageously be integrated with torrefaction step b) or not.

In an embodiment, the energy produced during combustion step ii) of the torrefaction gases (11) originating from step b) is used in order to provide the necessary energy for at least one step of the process, preferably for drying step a), and preferably also for final drying step d) using the flow (12) or for torrefaction step b) using the flow (13).

The thermal energy originating from combustion step ii) is sent to steps a), b) and/or d) by means known to a person skilled in the art.

A part of the hot gas flow (12) originating from combustion step ii) can advantageously be sent to a heat exchange step allowing the air used in drying step a) and in final drying step d) to be preheated.

In an embodiment, a part of the flow of hot gases (13) originating from combustion step ii) is directly injected into torrefaction step b) so as to provide by gas/solid heat exchange, the energy necessary for the conversion of the biomass feedstock.

If the flow of combustible torrefaction gas originating from step b) is insufficient, an addition of fuel and preferably of natural gas can advantageously by introduced in combustion step ii) so as to obtain the energy necessary for the different steps consuming thermal energy.

At the end of torrefaction step b), the torrefied biomass solid effluent (4) obtained has a moisture content comprised between 0.0 and 5.0% by weight, and preferably between 0.0 and 3.0% by weight. By torrefied biomass solid is meant a solid obtained by torrefaction of the biomass.

The torrefied biomass solid (4) obtained at the end of step b) can optionally be stored in an optional storage step before it is introduced in co-grinding step c) of the process according to the invention. Said storage step can advantageously be realized according to methods known to a person skilled in the art. Preferably, the torrefied solid biomass can be stored in tanks with screw conveyors, in silos, or under a hangar in suitable open cells.

In the advantageous case in which co-grinding step c) is implemented sequentially, a storage step makes it possible to continue to operate torrefaction step b) and optional combustion step ii) in order to continue to produce the hot gas flow (12) necessary for drying step a) and final drying step d).

Co-Grinding Step c)

According to the invention, the process comprises a step c) of co-grinding the torrefied biomass solid effluent (4) originating from step b), and having optionally been stored in an optional storage step, in the presence of at least one solid fossil feedstock (9) in order to obtain a ground effluent (5) also called ground powder (5). Said co-grinding step c) is implemented at a temperature comprised between 0° C. and 150° C. and preferentially between 20° C. and 100° C. and also preferentially between 50° C. and 90° C. The solid fossil feedstock (9) and the torrefied biomass solid (4) are ground simultaneously in one and the same mill.

The objective of co-grinding step c) is to reduce the granulometry of the two feedstocks (4) and (9) introduced in said step c), while providing a particle shape suitable for the subsequent transport and use thereof, and preferably for their injection into a gasification step. The particles of the effluent (5) at the end of said co-grinding step c) have an characteristic size comprised between 50 and 200 microns, preferably between 70 and 200 microns, and preferably between 80 and 150 microns.

Said solid fossil feedstock (9) introduced in co-grinding step c) is preferably selected from the solid fossil hydrocarbons such as coal, petcoke, oil tanker residues, bituminous sands or derivatives thereof and oil shales or derivatives thereof.

Preferably the dimensions of the solid fossil feedstock introduced in co-grinding step c) are comprised between 1 and 100 millimetres preferably between 2.0 and 80 millimetres, preferably between 3.0 and 70 millimetres, preferably between 4.0 and 60 millimetres and preferentially between 5 and 50 millimetres.

In a particular embodiment, the fossil feedstock can have dimensions of between 30 and 100 millimetres, preferably between 35 and 90 millimetres, preferably between 40 and 80 millimetres and preferably between 45 and 70 millimetres.

In another particular embodiment, the fossil feedstock can have dimensions of between 1.0 and 60 millimetres, preferably between 2.0 and 50 millimetres, preferably between 3.0 and 40 millimetres and preferably between 4.0 and 30 millimetres.

Preferably, the solid fossil feedstock (9) can undergo an optional crushing step in order to reduce the dimensions of said feedstock and to allow its introduction into co-grinding step c).

The solid fossil feedstock (9) can advantageously undergo a preliminary drying step iii) depending on its initial moisture content before being introduced into said co-grinding step c). Preliminary drying step iii) makes it possible to obtain a pre-dried fossil feedstock (10) and to make it compatible with its injection into co-grinding step c).

Preferably, the moisture content of the fossil feedstock (9) or (10), input into co-grinding step c) must be comprised between 3.1 and 30.0% by weight, preferentially between 4.0 and 25.0% by weight and very preferably comprised between 5.0 and 20.0% % by weight.

Preferably, the torrefied biomass solid effluent (4) and the solid fossil feedstock (9) or (10) are introduced in said co-grinding step c) so that the percentage by weight between the torrefied biomass solid effluent in the total solid feedstock feeding the co-grinding step c) is comprised between 1 and 99% by weight, preferably between 50 and 98% by weight, preferably between 40 and 95% by weight. By solid feedstock is meant the sum of the torrefied biomass solid (4) and the fossil feedstock (9) or (10).

Preferably, the co-grinding step can be implemented in the presence of an additional compound useful for the subsequent gasification step, said compound is chosen from vitrified ash, sand, limestone, lime or other compounds known to a person skilled in the art used alone or in a mixture.

Preferably, the mill is chosen so as to optimize the pneumatic transport of powder (5) obtained originating from step c), minimizing the minimum fluidization velocity (MFV), as well as its own energy consumption.

Preferably, said co-grinding step c) is implemented in a mill of the "roller mill", "universal" or "attrition" type, or any other types of mill known to a person skilled in the art.

Surprisingly, the applicant has noted that co-grinding of the torrefied biomass solid (4) and the solid fossil feedstock (9) or (10) also leads, in addition to the grinding of the solid fossil feedstock (9) or (10), to particularly efficient drying of said feedstock (9) or (10). In fact, the grinding is a very exothermic step. In addition, implementation as described according to the invention allows an intimate mixture of the two types of feedstocks. Thus, the co-grinding of a not very moist feedstock, such as the torrefied biomass solid effluent with a moist feedstock, such as the solid fossil feedstock, allows a transfer of the heat generated by grinding of the biomass to the water contained in the moist solid fossil feedstock and thus optimizes the drying thereof. This simultaneous drying advantageously makes it possible to simplify the number of steps of the process as well as limiting its energy consumption.

Optional Final Drying Step d)

Preferably, the process according to the invention can comprise a step d) of final drying of the powder (5) obtained at the end of step c). This final drying step d) is implemented by bringing the feedstock into contact with a flow of gas. Said flow of gas enters said step at a temperature comprised between 50 and 150° C., preferably between 70 and 120° C., in order to produce a dried powder (6).

The objective of the optional final drying step d) is to reduce the moisture content of the powder (5) originating from step c) to an acceptable level for its injection into a subsequent treatment step and preferably into a gasification step. Preferably, the optional final drying step d) makes it possible to lower the moisture content of the powder obtained at the end of step c) to below 3.0% by weight, preferably between 1.0 and 3.0% by weight.

Preferably, the final drying step d) is carried out simultaneously with the co-grinding step c).

The thermal energy necessary for this drying is supplied either by combustion of a flow input into the process (natural gas for example), or preferentially by energy integration via means of a heat exchange preheating the drying air by using a hot effluent (12) from the combustion step ii). According to the invention, the choice of a sufficiently high percentage of anhydrous weight loss in torrefaction step b) makes it possible to limit the use of an input fuel in the process in step d); in particular, it limits the use of fuel of fossil origin.

Optional Storage Step e)

The process according to the invention can advantageously comprise one or more steps e) of storage of the effluent originating from one or more of the steps of the process, preferably step a), b), c) or d). Preferably, the effluent originating from step c) or d) is stored in order to produce a stored effluent (7) also called stored powder (7).

The storage makes it possible to retain a buffer volume of feedstock. This volume is necessary in order to retain the ability to operate the downstream section in the case of a stoppage of the upstream section.

Storage step e) is preferentially constituted by silos having sufficient useful volumes in order to ensure the supply of the downstream section. For example, the volume of these silos must provide the downstream section with 24 to 48 hours' supply.

Storage step e) can also include a pressurization system by means of various successive tanks operating sequentially so as to increase the storage pressure of the feedstock until reaching a pressure compatible with its injection into a subsequent step and preferably into a gasification step.

Optional Transport Step f)

The effluent (5) originating from step c) or the effluent (6) originating from step d) or the effluent (7) originating from storage step e) can advantageously undergo a transport step f). The effluent transported in this way is called transported effluent (8) or also transported powder (8). The transport step f) makes it possible to convey the effluent (5), (6) or (7), preferably formulated and having the desired composition, to a subsequent step and preferably to a gasification step g).

Preferably, the transport step f) is implemented according to pneumatic transport technology.

The carrier gas used in step f) of transfer by pneumatic transport is preferentially nitrogen, carbon dioxide or any other inert gas making it possible to avoid the formation of a zone with an explosive atmosphere (ATEX powders) and compatible with the subsequent step situated downstream and preferably with gasification step g).

The carrier gas is calculated according to methods known to a person skilled in the art so as to obtain both the desired flow rate and density of the transport. The parameters of torrefaction step b) and of co-grinding step c) are selected so as to optimize the quality of this transport (MFV optimized according to the energy consumption of these sections).

Optional Gasification Step g)

The powder originating from step c), d) or from a storage step e) is transported to step f), preferably formulated and having the desired composition can advantageously be sent to a subsequent gasification step g).

Said gasification step g) implements a partial oxidization reaction which converts the feedstock to a synthesis gas comprising a majority of carbon monoxide and hydrogen. Gasification step g) advantageously operates in the presence of a controlled quantity of oxygen in the form of a flow the flow rate of which is controlled and containing at least 90% by volume of oxygen, preferably at least 96% by volume of oxygen.

Gasification step g) of the effluent (8) is advantageously carried out according to methods known to a person skilled in the art.

Preferably it is carried out in a gasifier of the fixed-bed or fluidized-bed type, or preferably in a entrained flow gasifier with cooled walls at a high temperature, i.e. at a temperature comprised between 800 and 1800° C., preferably between 1000 and 1600° C. and more preferentially between 1200 and 1500° C. and at an absolute pressure advantageously comprised between 2 and 12 MPa, preferably between 2.5 and 6 MPa, and more preferentially between 3 and 5 MPa. The high temperature makes it possible to obtain a high carbon conversion rate and therefore to reduce the quantity of unconverted carbon in the ashes produced and thus reduce the quantity of ashes recycled to the gasifier.

In a particular embodiment of the invention, the process comprises steps a), b), and c), or steps a), b), c) and d), or steps a), b), c), d), and e), or steps a), b), c), d), e) and f), or steps a), b), c), d), e), f) and g).

In a particular embodiment of the invention, the process is constituted by steps a), b), and c), or steps a), b), c) and d), or steps a), b), c), d), and e), or steps a), b), c), d), e) and f), or steps a), b), c), d), e), f) and g).

The biomass feedstock (I) can undergo a step i) of pretreatment prior to its introduction into step a). The pretreated biomass feedstock (II) or the biomass feedstock (I) is dried during step a) in order to produce a dried biomass feedstock (III), also called effluent (III). Said effluent (III) originating from step a) is then torrefied in a step b). The torrefaction step b) produces a solid effluent called torrefied biomass (IV). The torrefied biomass solid effluent (IV) originating from step b) is then ground in step c). The powder (V) originating from the co-grinding step c) can optionally be dried in final drying step d). The powder (V) originating from step c) or the powder (VI) originating from step d) can undergo a storage step e). The stored powder (VII) or the ground powder (V) or the dried powder (VI) can be involved in a transport step f). The powder (VIII) thus transported can be involved in a gasification step g).

The solid fossil feedstock (IX) is ground in step c'). The powder (X) originating from the grinding step c') is dried during the final drying step d') in order to produce a dried powder (XI). Said powder (XI) originating from step c') undergoes a storage step e'). The stored powder (XII) or the dried powder (XI) or the ground powder (X) is involved in a transport step f'). The powder (XIII) thus transported can be involved in a gasification step g).

Figure 2:
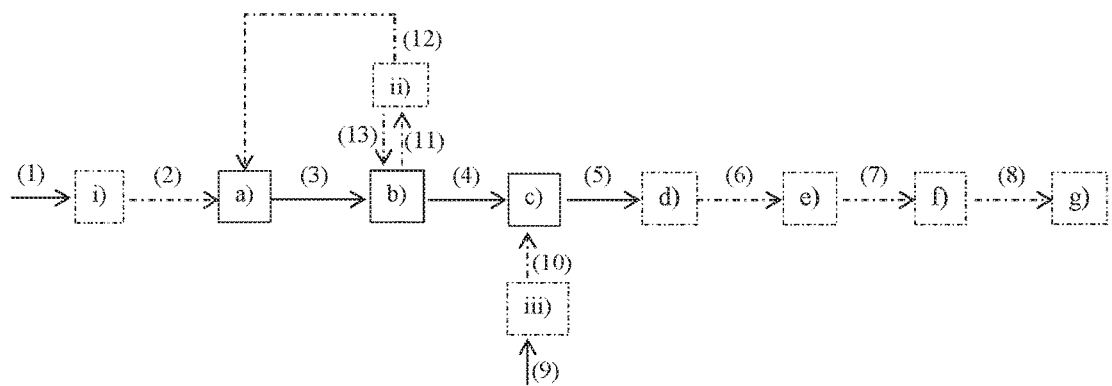

FIG. 2 shows the general layout of the process according to the invention implemented in Example 2. The biomass feedstock (1) can undergo a step i) of pretreatment prior to its introduction into step a). The pretreated biomass feedstock (2) or the biomass feedstock (1) is dried during step a) in order to produce a dried biomass feedstock (3), also called effluent (3). Said effluent (3) originating from step a) is then torrefied in a step b). The torrefaction step b) produces a solid effluent called torrefied biomass (4). The torrefied biomass solid effluent (4) originating from step b), is then co-ground in step c) in the presence of at least one solid fossil feedstock (9) in order to obtain a powder. Before its introduction into co-grinding step c), the solid fossil feedstock (9) can undergo a preliminary drying step iii) making it possible to obtain a pre-dried fossil feedstock (10). The powder (5) originating from the co-grinding step c) can optionally be dried during the final drying step d). The co-ground powder (5) originating from step c) or the dried powder (6) originating from step d) can undergo a storage step e). The stored powder (7) or the ground powder (5) or the dried powder (6) can be involved in a transport step f). The powder (8) thus transported can be involved in a gasification step g). The torrefaction gases (11) originating from the torrefaction step b) are sent to a combustion step ii) in which they are burned in order to produce a flow of hot gases (12) which allow the heating of drying step a) directly, or indirectly via a heat exchanger. The gases originating from combustion step ii) are also burned in order to produce a flow of hot gases (13) sent to torrefaction step b).

Figure 3:
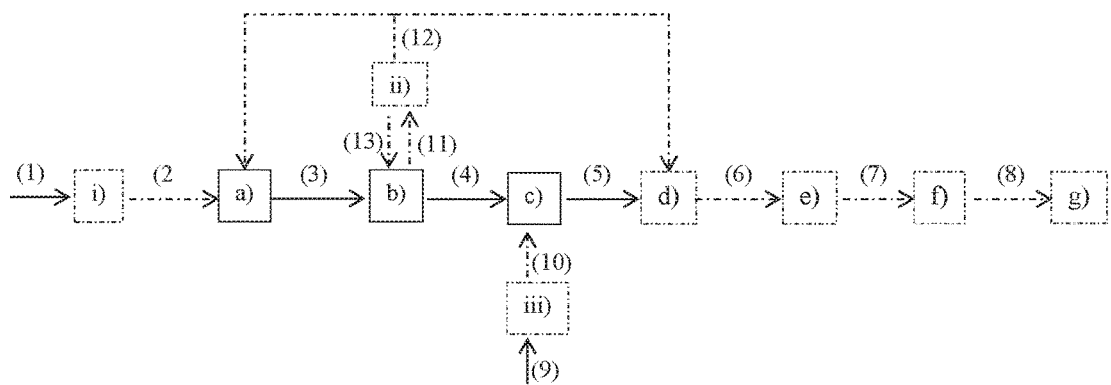

FIG. 3 shows the general layout of the process according to the invention implemented in Example 3. Said process is a variant of the process implemented in Example 2, comprising in addition an energy integration to final drying step d). In this variant, the torrefaction gases (12) allow the heating of final drying step d) directly, or indirectly via a heat exchanger.

The following examples illustrate the invention but without however limiting its scope.

EXAMPLES

Example 1: Process without Co-Grinding
(According to the Prior Art)

Figure 1:
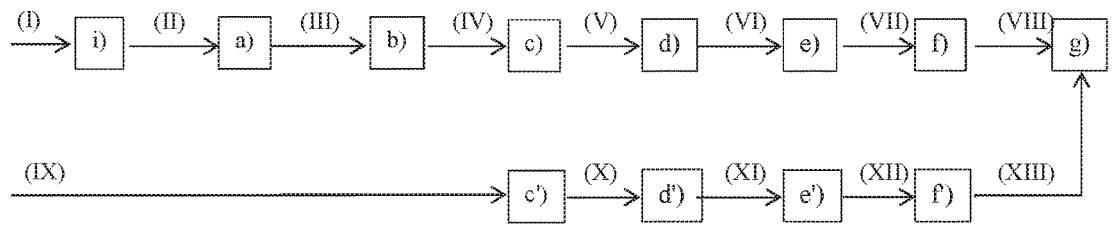
FIG. 1 shows the general layout of the process of the prior art implemented in Example 1. The treatments of the biomass and of the solid fossil feedstock are carried out independently up to their injection into an optional gasification step g).

FIG. 1 shows the general layout of the process of the prior art according to Example 1.

According to this example, the process allows 2 feedstocks to be treated:

A feedstock A of the lignocellosic biomass type in the form of oak wood chips of characteristic size 20 to 30 mm. The moisture content of this feedstock is 30% by weight.

A feedstock B of fossil (coal) type, in the form of particles of characteristic size comprised between 5 and 50 mm.

This process does not have a co-grinding step, nor a step of energy integration between the line for the preparation of feedstock A and that for the preparation of the feedstock B.

The process for the treatment of the feedstock A has a energy integration step from torrefaction step b) to step a) of drying the feedstock.

The objective of this process is to prepare 1 tonne of feedstock per hour for the downstream process, here a gasification process. The feedstock produced must be composed of 75% of dry and ash-free (DAF) biomass, and 25% of DAF fossil feedstock.

Description of the Line for the Preparation of Feedstock A:

The feedstock A is sent to a drying step allowing the moisture content of the feedstock to be reduced to 3% by weight. The temperature of the solid at the end of the drying step is 70° C.

The dried chips are conveyed into a torrefaction step operating at an average temperature of 300° C. The anhydrous weight loss during the torrefaction step is 27%. The residual moisture of the chips at the end of this step is considered to be zero.

The dried and torrefied chips are sent to a grinding step in which the technology is known to a person skilled in the art, for example of the roller mill type. This step makes it possible to reduce the granulometry of a majority (90% of the particles) to below 90 microns. The technique used for the characterization of the granulometry uses sieves according to the standard NF EN 933.

According to this example, there is no step called final drying step; the feedstock A in the form of dried and torrefied powder is sent by means of pneumatic transport in dilute phase into a storage step then into a pneumatic transport step making it possible to inject it into the downstream gasification process. The pneumatic transport is here carried out in dense phase. The dense-phase pneumatic transport step is here carried out with an inert carrier gas, the gas being nitrogen in this example.

Description of the Line for the Preparation of Feedstock B:

The feedstock B is sent directly to a grinding step the technology of which is known to a person skilled in the art, for example of the centrifugal roller mill type (for crushing). This step makes it possible to reduce the granulometry of a majority (90% of the particles) to below 90 microns. The technique used for the characterization of the granulometry uses sieves according to the standard NF EN 933. Concomitantly with the grinding step, the feedstock undergoes a final drying step making it possible to bring its moisture content to 3% by weight. This final drying step is implemented by means of the use of a natural gas burner heating a gas flow which is brought into direct contact with the feedstock during grinding so as to dry it.

The feedstock B in the form of dried powder is sent by means of pneumatic transport in dilute phase into a storage step then into a pneumatic transport step making it possible to inject it into the downstream gasification process. The pneumatic transport is here carried out in dense phase. The dense-phase pneumatic transport step is carried out with nitrogen as inert carrier gas.

The table below gives the utilities consumption of this layout:

| | Utilities & production | | |
|---|---|---|---|
| | DAF biomass feedstock | t/h | 1.02 |
| | DAF fossil feedstock | t/h | 0.25 |
| | Feedstock produced | t/h | 1.00 |
| All of the steps | Electricity consumed | MJ/h | 127 |
| Steps d) and d') | Natural gas consumed | MJ/h | 130 |
| Steps e), f), e') and f') | Nitrogen consumed | Nm$^3$/h | 313 |

The electricity consumed includes the electricity necessary for grinding in the centrifugal mill.

The natural gas consumed corresponds to the primary and final drying steps.

Example 2: Process with Co-Grinding and without Energy Integration to Step (According to the Invention)

FIG. 2 shows the layout of the process according to the invention implemented in Example 2.

According to this example, the process allows two feedstocks to be treated:
- A feedstock A of the lignocellosic biomass type in the form of oak wood chips of characteristic size 20 to 30 mm. The moisture content of this feedstock is 30% by weight.
- A feedstock B of fossil (coal) type, in the form of particles of characteristic size comprised between 10 and 30 mm.

This process has a co-grinding step between the line for the preparation of the feedstock A and that for the feedstock B and does not have any energy integration to drying step d). The co-grinding and final drying steps are carried out simultaneously The heat originating from the combustion of the torrefaction gases is used in torrefaction step b) as well as for drying step a).

The objective of this process is to prepare 1 tonne of feedstock per hour for the downstream gasification process. The feedstock produced must be composed of 75% Dry and Ash-Free (DAF) biomass, and 25% DAF fossil feedstock. Description of the Line for the Preparation of Mixed Feedstock:

The feedstock A is sent to a drying step allowing the moisture content of the feedstock to be reduced to 3% by weight. The temperature of the solid at the end of the drying step is 70° C. The dried chips are conveyed into a torrefaction step operating at an average temperature of 300° C. The anhydrous weight loss during the torrefaction step is 27%. The residual moisture of the chips at the end of this step is negligible and is considered to be zero.

The dried and torrefied chips are sent to a co-grinding step the technology of which is known to a person skilled in the art, for example of the centrifugal roller mill type. The feedstock B is conveyed directly into this same mill. This step makes it possible to reduce the granulometry of a majority (90% of the particles) to below 90 microns. The technique used for the characterization of the granulometry uses sieves according to the standard NF EN 933.

According to this example, the mixture of feedstocks undergoes a drying step d) concomitantly with the grinding step. An unexpected effect of this grinding-drying in a mixture is to reduce the energy necessary for drying the feedstock B. In fact, grinding of the feedstock A is exothermic and produces heat used for drying the feedstock B. Said heat generated by the grinding of A makes it possible to significantly reduce the energy consumed for the drying. This effect is reflected in the natural gas consumption of the burner, allowing the temperature of the atmosphere of the burner to be increased. Mixing of feedstocks A and B in the form of dried powder originating from the grinding is sent by means of pneumatic transport in dilute phase into a storage step then into a pneumatic transport step making it possible to inject it into the downstream gasification process. The pneumatic transport is carried out in dense phase. The dense-phase pneumatic transport step is here carried out with an inert carrier gas, the gas being nitrogen in this example.

The nitrogen corresponds to the requirements for pneumatic transport and aeration in the silos.

The table below gives the utilities consumption of this layout:

| | Utilities & production | | |
|---|---|---|---|
| | DAF biomass feedstock | t/h | 1.02 |
| | DAF fossil feedstock | t/h | 0.25 |
| | Feedstock produced | t/h | 1.00 |
| All of the steps | Electricity consumed | MJ/h | 126 |
| Steps d) | Natural gas consumed (PCI) | MJ/h | 109 |
| Steps e) and f) | Nitrogen consumed | Nm3/h | 338 |

The electricity consumed includes the electricity necessary for the grinding in the centrifugal mill.

The natural gas consumed corresponds to final drying step d).

The nitrogen corresponds to the requirements for pneumatic transport and aeration in the silos.

Example 3: Process with Co-Grinding with Energy Integration to Final Drying Step d) (According to the Invention)

FIG. 3 shows the layout of the process according to the invention implemented in Example 3.

This process has a co-grinding step between the line for the preparation of the feedstock A and that for the feedstock B and therefore allows two feedstocks to be treated on one and the same preparation line. In addition, this process has energy integration to final drying step d).

The co-grinding and final drying steps are carried out simultaneously.

The characteristics of the feedstocks A and B utilized in this process are identical to those of feedstocks A and B utilized in Example 2.

The heat originating from the combustion of the torrefaction gas is used in torrefaction step b) as well as for drying step a).

The advantage of the process implemented in this example is an energy integration from the torrefaction step to the final drying step of the powder of the feedstock mixture. In this case, the anhydrous weight loss is approximately 28% and advantageously makes it possible to produce the heat necessary for said final drying.

The energy integration also called thermal integration is here carried out indirectly via the use of a heat exchanger.

The table below gives the utilities consumption of this layout:

| | Utilities & production | | |
|---|---|---|---|
| | DAF biomass feedstock | t/h | 1.04 |
| | DAF fossil feedstock | t/h | 0.25 |
| | Input feedstock | t/h | 1.00 |
| All of the steps | Electricity consumed | MJ/h | 127 |
| Step d) | Natural gas consumed (PCI) | MJ/h | 0 |
| Steps e) and f) | Nitrogen consumed | Nm3/h | 340 |

The electricity consumed includes the electricity necessary for the grinding in the centrifugal mill.

The natural gas consumed corresponds to final drying step d).

The nitrogen corresponds to the requirements for pneumatic transport and aeration in the silos.

These examples clearly show that co-grinding (Example 2) of the feedstocks A and B makes it possible to significantly reduce the consumption of natural gas, from 130

(Example 1) to 109 MJ/h. Furthermore, the energy integration to final drying step d) (Example 3) allows it to be autothermic, i.e. with no need for an external supply of energy. The input feedstock flow rate into the process is then 1.04 t/h for a production of 1.0 t/h. The corresponding anhydrous weight loss thus makes it possible to generate the heat necessary for the thermal integration of the torrefaction with the final drying of the feedstock.

The invention claimed is:

1. A process for the treatment of a feedstock comprising biomass, said process comprising at least the following steps:
   a) a step of drying said feedstock comprising biomass at a temperature of 20 to 180° C. for a duration of 5 to 180 minutes,
   b) a step of torrefaction of the dried feedstock originating from step a) producing at least one torrefied biomass solid effluent, and
   c) a step of co-grinding of the at least one torrefied biomass solid effluent originating from step b), in the presence of at least one solid fossil feedstock obtaining a powder,
   in which
   the quantity of residual water at the end of drying step a) is 0.0% to 5.0% by weight with respect to the total weight of the feedstock,
   the dimensions of the solid fossil feedstock introduced in co-grinding step c) are 1 to 100 millimeters, and
   the solid fossil feedstock input into co-grinding step c) has a moisture content of 3.1 to 30.0% by weight,
   and
   one or more of the following conditions 1), 2), 3) and/or 4):
   1) the biomass is a lignocellosic biomass selected from the group consisting of grass biomass, residues from agricultural operations, waste straw, maize cobs, crushed sugar cane stalks, residues from forestry operations, residues from sawmills and wood chips,
   2) the at least one solid fossil feedstock is selected from the group consisting of solid fossil hydrocarbons, coal, petcoke, oil tanker residues, bituminous sands, derivatives of bituminous sands, oil shales and derivatives of oil shales,
   3) the at least one torrefied biomass solid effluent originating from step b) is introduced in co-grinding step c) in a percentage by weight between the torrefied biomass solid effluent in the total solid feedstock of 40 to 99% by weight, said total solid feedstock being the sum of the torrefied biomass solid effluent and the fossil feedstock, and/or
   4) the step of co-grinding of the at least one torrefied biomass solid effluent originating from step b) is performed at a temperature of 0° C. to 150° C.,
   and
   one or more of the following additional conditions i), ii), iii) and/or iv);
   i) torrefied biomass solid effluent originating from step b) is introduced in cogrinding step c) in a percentage by weight between the torrefied biomass solid effluent in the total solid feedstock of 75% by weight, said total solid feedstock being the sum of the torrefied biomass solid effluent and the fossil feedstock,
   ii) torrefied biomass solid effluent originating from step b) is introduced in cogrinding step c) in a percentage by weight between the torrefied biomass solid effluent in the total solid feedstock of 50 to 98% by weight, said total solid feedstock being the sum of the torrefied biomass solid effluent and the fossil feedstock, and/or
   iii) torrefied biomass solid effluent originating from step b) is introduced in cogrinding step c) in a percentage by weight between the torrefied biomass solid effluent in the total solid feedstock of 40 to 95% by weight, said total solid feedstock being the sum of the torrefied biomass solid effluent and the fossil feedstock, and/or
   iv) all of conditions 1), 2), 3) and 4).

2. The process according to claim 1, further comprising a step d) of final drying of the powder obtained at the end of step c) at a temperature of 100 to 300° C.

3. The process according to claim 2, in which the final drying step d) is carried out simultaneously with the co-grinding step c).

4. The process according to claim 1, in which the biomass is wood chips.

5. The process according to claim 1, further comprising a step i) of pretreatment of the biomass.

6. The process according to claim 1, in which the torrefaction step b) is carried out at a temperature of 200 to 350° C., for a duration of 5 to 180 minutes, at an absolute operating pressure of 0.1 and 15 bar.

7. The process according to claim 1, further comprising a step ii) of combustion of torrefaction gases (11) originating from step b).

8. The process according to claim 7, in which energy originating from step ii) of combustion of the torrefaction gases (11) provides thermal energy in a step of the process.

9. The process according to claim 1, in which the solid fossil feedstock introduced in co-grinding step c) is coal.

10. The process according to claim 1, in which the solid fossil feedstock undergoes a step iii) of preliminary drying.

11. The process according to claim 1, in which torrefied biomass solid effluent originating from step b) is introduced in co-grinding step c) in a percentage by weight between the torrefied biomass solid effluent in the total solid feedstock of 75% by weight, said total solid feedstock being the sum of the torrefied biomass solid effluent and the fossil feedstock.

12. The process according to claim 1, in which the solid fossil feedstock input into co-grinding step c) has a moisture content of 5.0 to 20.0% by weight.

13. The process according to claim 1, further comprising one or more steps e) of storage of the effluent originating from any of the steps of the process.

14. The process according to claim 1, further comprising a step f) of transport.

15. The process according to claim 1, further comprising a step g) of gasification at a temperature of 800 to 1800° C., and at an absolute pressure of 2 to 12 MPa.

16. The process according to claim 1, wherein the dimensions of the solid fossil feedstock introduced in co-grinding step c) are 2.0 to 80 millimeters.

17. The process according to claim 1, wherein the solid fossil feedstock input into co-grinding step c) has a moisture content of 4.0 to 25.0% by weight.

18. The process according to claim 1, in which torrefied biomass solid effluent originating from step b) is introduced in co-grinding step c) in a percentage by weight between the torrefied biomass solid effluent in the total solid feedstock of 50 to 98% by weight, said total solid feedstock being the sum of the torrefied biomass solid effluent and the fossil feedstock.

19. A process for the treatment of a feedstock comprising biomass, said process comprising at least the following steps:

d) a step of drying said feedstock comprising biomass at a temperature of 20 to 180° C. for a duration of 5 to 180 minutes, e) step of torrefaction of the dried feedstock originating from step d) producing at least one torrefied biomass solid effluent, and f) step of co-grinding of the at least one torrefied biomass solid effluent originating from step e), in the presence of at least one solid fossil feedstock containing a powder, in which the quantity of residual water at the end of drying step d) is 0.0% to 5.0% by weight with respect to the total weight of the feedstock, the dimensions of the solid fossil feedstock introduced in co-grinding step to 100 millimeters, and the solid fossil feedstock input into co-grinding step f) has a moisture content of 3.1 to 30.0% by weight, and torrefied biomass solid effluent originating from step e) is introduced in co-grinding step f) in a percentage by weight between the torrefied biomass solid effluent in the total solid feedstock of 40 to 95% by weight, said total solid feedstock being the sum of the torrefied biomass solid effluent and the fossil feedstock, and one or more of the following conditions:

the biomass is a lignocellosic biomass selected from the group consisting of grass biomass, residues from agricultural operations, waste straw, maize cobs, crushed sugar cane stalks, residues from forestry operations, residues om sawmills and wood chips, the at least one solid fossil feedstock is selected from the group consisting of solid fossil hydrocarbons, coal, petcoke, oil tanker residues, bituminous sands, derivatives of bituminous sands, oil shales and derivatives of oil shales, the at least one torrefied biomass solid effluent originating from step e) is introduced in co-grinding step f) in a percentage by weight between the torrefied biomass solid effluent in the total solid feedstock of 40 to 99% by weight, said total solid feedstock being the sum of the torrefied biomass solid effluent and the fossil feedstock, and/or the step of co-grinding of the at least one torrefied biomass solid effluent originating from step e) is performed at a temperature of 0° C. to 150° C.

20. The process according to claim 1, further comprising a step i) of pretreatment of the biomass, which is primary grinding.

21. The process according to claim 1, wherein in the torrefaction step b) torrefaction gas is produced, wherein the quantity of the torrefaction gas is 5 to 40% of the weight of dried biomass originating from step a).

22. The process according to claim 1, wherein in the torrefaction step b) anhydrous weight loss of 1.0 and 40.0% by weight occurs with respect to the total weight of the feedstock (3) introduced into the torrefaction step b).

23. The process according to claim 1, wherein in the torrefaction step b) torrefaction gas is produced, which torrefaction gas is sent to a combustion step ii) in which said torrefaction gas is burned and produces a flow of hot gas, which gas is sent to drying step a) and/or d), or to torrefaction step b).

24. The process according to claim 1, wherein the step of co-grinding of the at least one torrefied biomass solid effluent originating from step b) is performed at a temperature of 0° C. to 150° C.

25. A process for the treatment of a feedstock comprising biomass, said process arising at least the following steps:

g) a step of drying said feedstock comprising biomass at a temperature of 20 to 180° C. for a duration of 5 to 180 minutes, h) step of torrefaction of the dried feedstock originating from step g) producing least one torrefied biomass solid effluent, and i) step of co-grinding of the at least one torrefied biomass solid effluent originating from step h), in the presence of at least one solid fossil feedstock containing a powder, in which the quantity of residual water at the end of drying step g) is 0.0% to 5.0% b weight with respect to the total weight of the feedstock, the dimensions of the solid fossil feedstock introduced in co-grinding step i) are 1 to 100 millimeters, and the solid fossil feedstock input into co-grinding step i) has a moisture of 3.1 to 30.0% by weight, and wherein all of the following conditions are satisfied:

the biomass is a lignocellosic biomass selected from the group consisting of grass biomass, residues from agricultural operations, waste straw, maize cobs, crushed sugar cane stalks, residues from forestry operations, residues from sawmills and wood chips, the at least one solid fossil feedstock selected from the group consisting of solid fossil hydrocarbons, coal, petcoke, oil tanker residues, bituminous sands, derivatives of bituminous sands, oil shales and derivatives of oil shales, the at least one torrefied biomass solid effluent originating from step h) is introduced in co-grinding step i) in a percentage by weight between the torrefied biomass solid effluent in the total solid feedstock of 40 to 99% by weight, said total solid feedstock being the sum of the torrefied biomass solid effluent and the fossil feedstock, and the step of co-grinding of the at least one torrefied biomass solid effluent originating from step h) is performed at a temperature of 0° C. to 150° C.

* * * * *